United States Patent
Kim et al.

(10) Patent No.: US 7,920,904 B2
(45) Date of Patent: Apr. 5, 2011

(54) MOBILE TERMINAL

(75) Inventors: Eu-Gene Kim, Seoul (KR); Ha-Yong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 465 days.

(21) Appl. No.: 12/015,610

(22) Filed: Jan. 17, 2008

(65) Prior Publication Data

US 2008/0176609 A1 Jul. 24, 2008

(30) Foreign Application Priority Data

Jan. 19, 2007 (KR) .......................... 10-2007-0006290

(51) Int. Cl.
*H04M 1/00* (2006.01)
*H04R 9/08* (2006.01)
(52) U.S. Cl. ...................................... 455/575.1; 381/361
(58) Field of Classification Search .... 455/575.1–575.6, 455/90.1–90.3, 347, 566, 128, 575.8, 575.4, 455/550.1, 95, 558, 90.2, 569.1; 381/190, 381/174, 71.1, 94.1, 361, 151, 375
See application file for complete search history.

(56) References Cited

U.S. PATENT DOCUMENTS

| | | | | |
|---|---|---|---|---|
| 2005/0009580 A1* | 1/2005 | Konno | ........................ | 455/575.1 |
| 2005/0130716 A1* | 6/2005 | Shin et al. | .................. | 455/575.1 |
| 2005/0266892 A1 | 12/2005 | Schrack | | |
| 2007/0049359 A1* | 3/2007 | Sung | ........................... | 455/575.1 |
| 2008/0146285 A1* | 6/2008 | Lee et al. | ...................... | 455/566 |

FOREIGN PATENT DOCUMENTS

| | | |
|---|---|---|
| EP | 1 657 955 A1 | 5/2006 |
| JP | 2001-211089 A | 8/2001 |
| KR | 20-2000-0014209 | 5/2000 |
| WO | WO 97/42745 A1 | 11/1997 |
| WO | WO 99/12322 | 3/1999 |

* cited by examiner

*Primary Examiner* — Melody Mehrpour
(74) *Attorney, Agent, or Firm* — Birch, Stewart, Kolasch & Birch, LLP

(57) ABSTRACT

A mobile terminal including a terminal case, a microphone located within the terminal case, and a sound guide unit, is provided. The terminal case includes a first case member, a second case member, and a frame member located between the first case member and the second case member. The frame member includes a microphone hole formed on an outer surface thereof for guiding a sound into the terminal case in a first direction. The microphone includes a sound receiving portion disposed in a second direction different from the first direction, for receiving the sound. And the sound guide unit is located between the microphone hole and the sound receiving portion of the microphone, the sound guide unit guiding the sound, which has passed through the microphone hole, along the first direction and the second direction, toward the sound receiving portion of the microphone.

39 Claims, 6 Drawing Sheets

MOBILE TERMINAL

CROSS-REFERENCE TO RELATED APPLICATIONS

This application claims priority to Korean Patent Application No. 10-2007-0006290, filed Jan. 19, 2007, which is herein incorporated by reference.

BACKGROUND OF THE INVENTION

1. Field of the Invention

The present invention is directed generally to a mobile terminal having a microphone that receives a sound wave and generates a corresponding electrical signal and, more particularly, to a mobile terminal having a sound guide unit to guide sound to the microphone.

2. Description of Related Art

A conventional mobile terminal is a mobile device that can be portable and has one or more functions, such as voice and video call communication, inputting and outputting information, and storing data. As the functions have become more diversified, the mobile terminal provides additional complicated functions, such as capturing an image or video, reproducing music or video files, playing games, or receiving broadcast, etc. By comprehensively implementing such functions, the mobile terminal may be embodied in the form of a multimedia player.

In order to implement such functions of the multimedia player, various new modifications to the hardware or software of the mobile terminal are being designed. For example, a user interface environment allowing users to easily and conveniently search or select a function is being developed. Meanwhile, because users consider a mobile terminal as a personal portable device that may express their personality, there is much demand for mobile terminals with various designs.

The conventional mobile terminal transfers a call sound (a telephone voice, a talking voice, or a conversation voice) to another party or records it by using a microphone that receives a sound wave and generates a corresponding electrical signal. The microphone is required to be appropriately disposed in its relation with other elements, e.g., an input unit or a display unit, with in the mobile terminal.

Generally, a receiver of a conventional mobile terminal is positioned to be close to the user's ear while the microphone is positioned to be close to the user's mouth. Accordingly, in most cases, the microphone is installed on a lower end portion of a front surface the mobile terminal. In this case, while, the performance of the microphone may be suitable, the external appearance of the front surface of the mobile terminal is degraded and the overall length of the mobile terminal is inevitably lengthened.

BRIEF SUMMARY OF THE INVENTION

The present invention is directed to overcome certain drawbacks of the related art, as explained above, in addition to providing other benefits. For instance, it is desirable to provide a mobile terminal capable of securing performance of a microphone and aesthetically improving the external appearance by appropriately disposing the microphone in the mobile terminal.

According to principles of the present invention, a mobile terminal including a terminal case, a microphone located within the terminal case, and a sound guide unit, is provided. The terminal case may include a first case member, a second case member, and a frame member located between the first case member and the second case member. The frame member may include a microphone hole formed on an outer surface thereof for guiding a sound into the terminal case in a first direction. The microphone includes a sound receiving portion disposed in a second direction different from the first direction, for receiving the sound. And the sound guide unit may be located between the microphone hole and the sound receiving portion of the microphone, the sound guide unit guiding the sound, which has passed through the microphone hole, along the first direction and the second direction, toward the sound receiving portion of the microphone.

In another aspect, the second direction may be substantially perpendicular to the first direction.

In yet another aspect, the sound guide unit may have a cross sectional area that decreases extending along the first direction.

In still another aspect, the sound guide unit may be configured to concentrate the sound as the sound travels extending along the first direction.

In another aspect, the mobile terminal may include a speaker located at an end of the mobile terminal away from the microphone hole.

In a different aspect, the first case member may include a display located at a front surface and a receiver located at a side surface. The mobile terminal may further include a touch sensing unit located between the display and the first case member. In addition, at least one input unit may be located on a side of the terminal case. Alternatively, at least one input unit may be located on the front surface beneath the display.

In another aspect, the mobile terminal may include a circuitry supporting substrate located within the terminal case. The microphone may be located on the circuitry supporting substrate.

In a further aspect, the sound receiving portion of the microphone may face the circuitry supporting substrate.

In yet a further aspect, the circuitry supporting substrate may include a microphone mounting portion having a through hole, where the through hole is oriented in the second direction to allow the sound traveling in the second direct to pass therethrough toward the sound receiving portion of the microphone. In addition, the microphone mounting portion may protrude from a portion of the circuitry supporting substrate. The sound guide unit may include an edge portion that is configured to cover and hermetically close a rear surface and edges of the microphone mounting portion. The sound guide unit may further include a first channel configured to guide the sound in the first direction and a second channel configured to the guide the sound in the second direction to the through hole.

In still a further aspect, the mobile terminal may include a supporting plate arranged substantially parallel to the circuitry supporting substrate, and the sound guide unit may include a first wall portion having a lower surface attached to the supporting plate to define the first channel and a second wall portion having an upper surface attached to the circuitry supporting substrate to define the second channel.

In another aspect, the sound guide unit may be made from one of a flexible rubber and a plastic material.

In still another aspect, the third case member may include a supporting plate disposed horizontally at a lower portion of the microphone hole, and the sound guide unit may be configured to be supported by the supporting plate. In addition, the supporting plate may include a holding line portion and the sound guide unit is attached to the holding line portion.

According to principles of the present invention, a mobile terminal having a terminal case including a first case member and a second case member, one of the first case member and the second case member having a microphone hole formed on an outer surface thereof for guiding a sound into the terminal case in a first direction, is provided. The mobile terminal also includes a microphone located within the terminal case, the microphone having a sound receiving portion disposed in a second direction different from the first direction, for receiving the sound, and a sound guide unit located between the microphone hole and the sound receiving portion of the microphone, the sound guide unit guiding the sound, which has passed through the microphone hole, along the first direction and the second direction, toward the sound receiving portion of the microphone. Additional aspects of this mobile terminal are similar to those described above.

According to principles of the present invention, a sound guide for a mobile terminal, the mobile terminal having a microphone located on a circuitry supporting substrate within the mobile terminal, is provided. The sound guide includes a sound guide unit located at one side of the circuitry supporting substrate, the sound guide unit having a first guide portion for guiding sound along a first direction and a second guide portion for guiding the sound along a second direction different from the first direction toward a sound receiving portion of the microphone.

In another aspect, the sound guide unit may include a first wall portion that defines the first guide portion and a second wall portion that defines the second guide portion. In addition, the sound guide unit may include an edge extending from the second wall portion, the edge being configured to secure the second wall portion to the circuitry supporting substrate. Other aspects of the sound guide are similar to those described above.

According to principles of the present invention, a sound guide for a mobile terminal, the mobile terminal having a terminal case having a microphone hole formed on an outer surface thereof for guiding a sound into the terminal case in a first direction, and a microphone located on a circuitry supporting substrate within the terminal case, the microphone having a sound receiving portion disposed in a second direction different from the first direction, for receiving the sound, is provided. The sound guide includes a sound guide unit located at one side of the circuitry supporting substrate, the sound guide unit having a first guide portion for guiding the sound, which has passed through the microphone hole, along the first direction, and a second guide portion for guiding the sound along a second direction different from the first direction toward the sound receiving portion of the microphone. Additional aspects of the sound guide unit are similar to those described above.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

The mobile terminal according to an exemplary embodiment of the present invention will now be described in detail with reference to the accompanying drawings.

Figure 1:
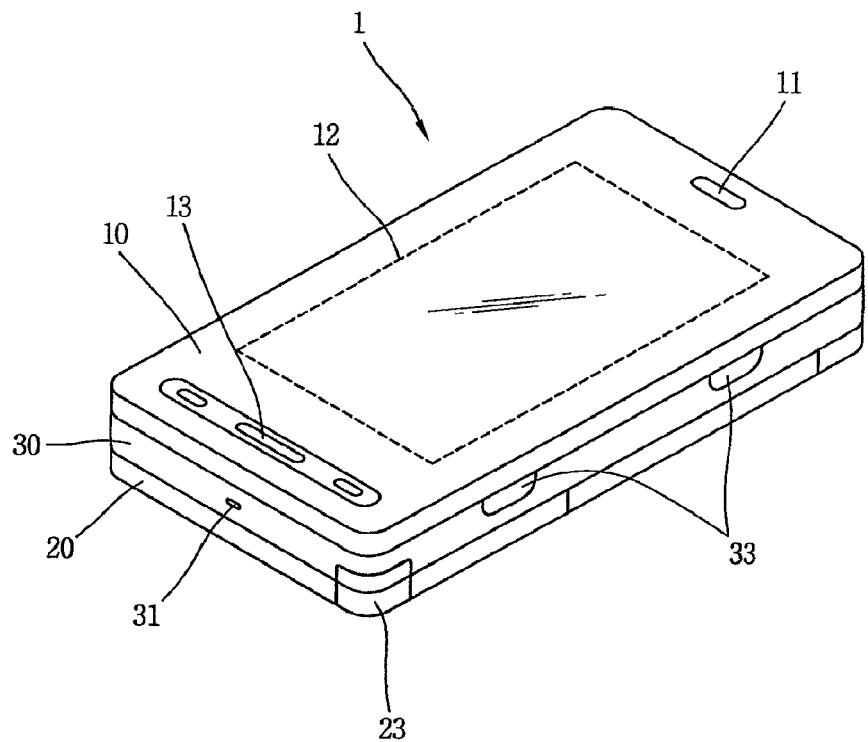
FIG. 1 is a front perspective view of a mobile terminal according to an exemplary embodiment of the present invention.

As shown in FIG. 1, the mobile terminal 1 according to an exemplary embodiment of the present invention includes a first case member 10 that forms the front external appearance of the mobile terminal 1, a second case member 20 that forms the rear external appearance of the mobile terminal 1, and a third case member 30 disposed between the first and second case members 10 and 20 and forms the side external appearance of the mobile terminal 1. Various components are installed in a space between the first and second case members 10 and 20. The third case member 30 may serve as a frame that supports such components. The case members 10, 20 and 30 may be made of a synthetic resin or a metallic material such as stainless steel (STS), titanium (Ti) or the like.

As shown in FIG. 1, the first case member 10 is configured to provide a front exterior of the terminal. A display 12, an audio output unit 11, and an input unit in the form of a push button 13 are disposed at an inner side of the first case member 10.

The display 12 may include a Liquid Crystal Display (LCD) module that visually displays information, an Organic Light Emitting Diode (OLED) module, or the like. In addition, the display 12 may be configured to be operated in a tactile manner. Particularly, a touch sensing unit may be provided between the first case member 10 and the display 12 to sense a touch applied to the front surface of the first case member. Accordingly, when an arbitrary point on the first case member 10 is touched, an item corresponding to the point can be inputted.

The audio output unit 11 may be implemented in the form of receiver or speaker. The audio output unit 11 may output various notification sounds or multimedia reproduction sounds, etc., of the system as well as a call sound. A plurality of audio output units 11 may be provided to implement a stereophonic sound function.

The push button 13 is provided at a lower end portion of the front surfaces of the first case member 10 to allow simple inputting in a push manner. The push button 13 may be excluded, and in this case, a wider display 12 can be provided. In addition, a scroll unit or a dial unit may be configured instead of the push button 13 or in conjunction with the push button 13. Here, the scroll unit or the dial unit refers to a device for facilitating a desired input or control by quickly moving a pointer or a curser displayed on the display 12 through a rotational movement of a scroll or a dial.

With reference to FIG. 1, unlike a microphone hole formed on the front surface in the related art, a microphone hole 31 is formed on the side of the third case member 30. Such configuration of the microphone hole 31 makes the first case member 10 simpler, improves the external appearance of the mobile terminal 1, and increases the area of the display 12 compared with the overall size of the mobile terminal 1. As a result, this configuration is advantageous in inputting or outputting a large amount of information. The position of the microphone hole 31 is not limited thereto, and although not shown, the microphone hole 31 may be formed on the first case member 10.

A broadcast reception antenna 23 that receives a broadcast may be provided at one side of the mobile terminal 1. The broadcast reception antenna 23 may have a length suitable for receiving a terrestrial wave broadcast having a relatively long wavelength. In addition, the broadcast reception antenna 23 may be a retractable antenna that is extendable outside the mobile terminal 1. For example, the retractable antenna may be in the form of one extendable member or a plurality of telescoping members. Besides the broadcast reception antenna 23 shown in FIG. 1, an internal antenna that can receive a broadcast through a satellite, such as television broadcasts, may be provided at the mobile terminal 1.

With reference to FIG. 1, the microphone hole 31 is formed on the side of the third case member 30, thereby allowing a call sound or a sound wave to be recorded to enter in an inner direction of the third case member 30. The structure for guiding the sound coming into the interior of the microphone hole 31 will be described with reference to FIGS. 3 to 7 in detail below.

Input units in the form of side keys 33 and 34 may be installed on the side of the second case member 20. The side keys 33 and 34 may be called, together with the push button 13, a manipulating portion, and any method can be employed for the manipulation portion so long as it can be operated by the user in a tactile manner. For example, the side keys 33 and 34 may be implemented as a dome switch or touch pad that can receive user commands or information according to pushing or touching, or implemented in the form of a wheel or a jog.

Figure 2:
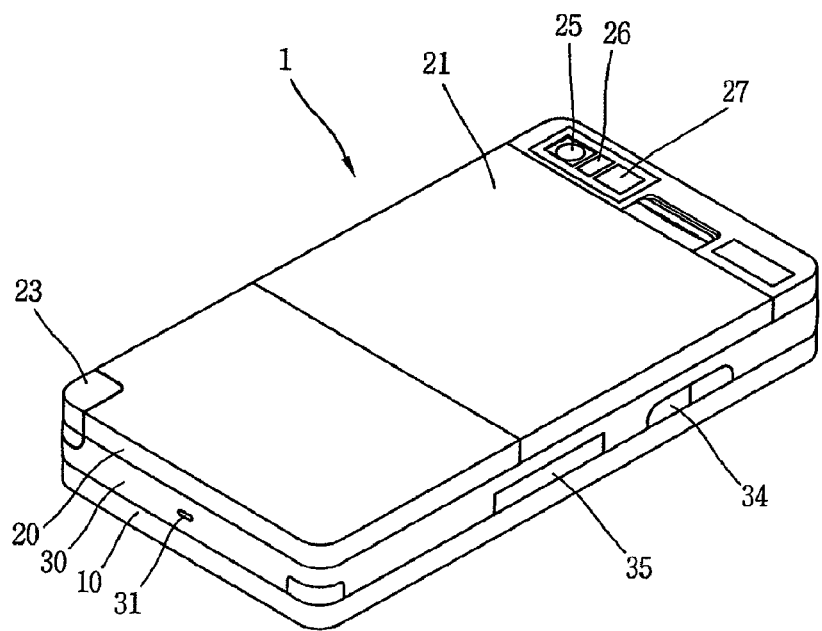
FIG. 2 is a rear perspective view of the mobile terminal of FIG. 1.

As shown in FIG. 2, a battery cover 21 is mounted on the second case member 20. Alternatively, a pack formed by integrating the battery and the cover can be mounted instead of the cover 21.

In addition to the battery cover 21, an image input unit 25 may be disposed on the rear of the mobile terminal 1, particularly, the second case member 20. The image input unit 25 may be configured in the form of camera to capture an image of a subject and may be installed to be rotatable to face the front side of the mobile terminal 1. A flash 26 and a mirror 27 are additionally disposed adjacent to the image input unit 25. When an image of the subject is captured with the image input unit 25, the flash 26 illuminates the subject. The mirror 27 allows the user to see himself when he wants to capture his own image (self-image capturing) by using the image input unit 25.

An external interface 35 may be installed at the side of the mobile terminal 1. The external interface 35 is used as a link (passage or path) through which the mobile terminal can exchange data or the like with an external device. For example, the external interface 25 may be implemented as one of a connection port for connecting an earphone to the mobile terminal via a fixed or wireless means, a port for short-range communications (e.g., an Infrared Data Association (IrDA) port, a BLUETOOTH port, a wireless LAN port, etc.), or power supply ports for providing power to the mobile terminal. In addition, the external interface 35 may be a card socket for accommodating an external card, such as a Subscriber Identity Module (SIM), a User Identity Module (UIM), a memory card for storing information, or the like.

Figure 3:
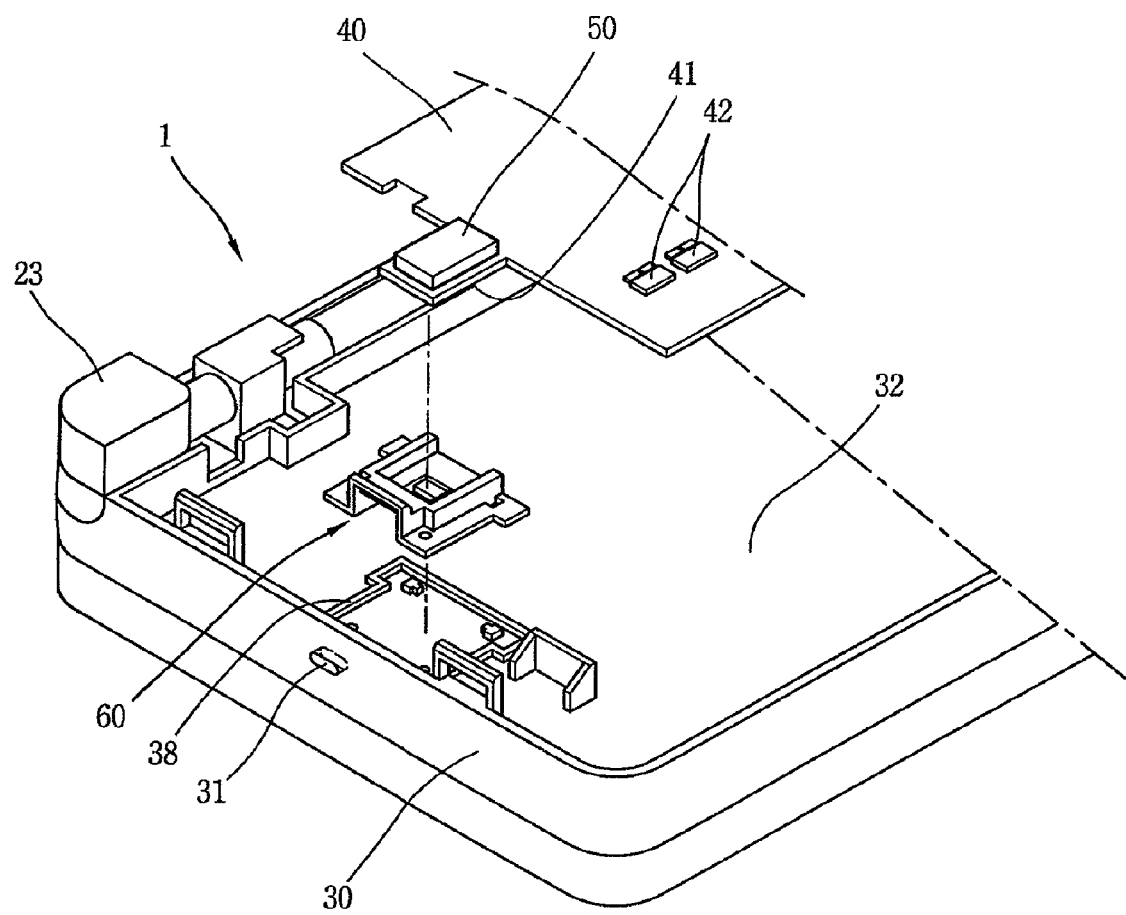
FIG. 3 is a partial front exploded perspective view showing the microphone of the mobile terminal of FIG. 1.
Figure 4:
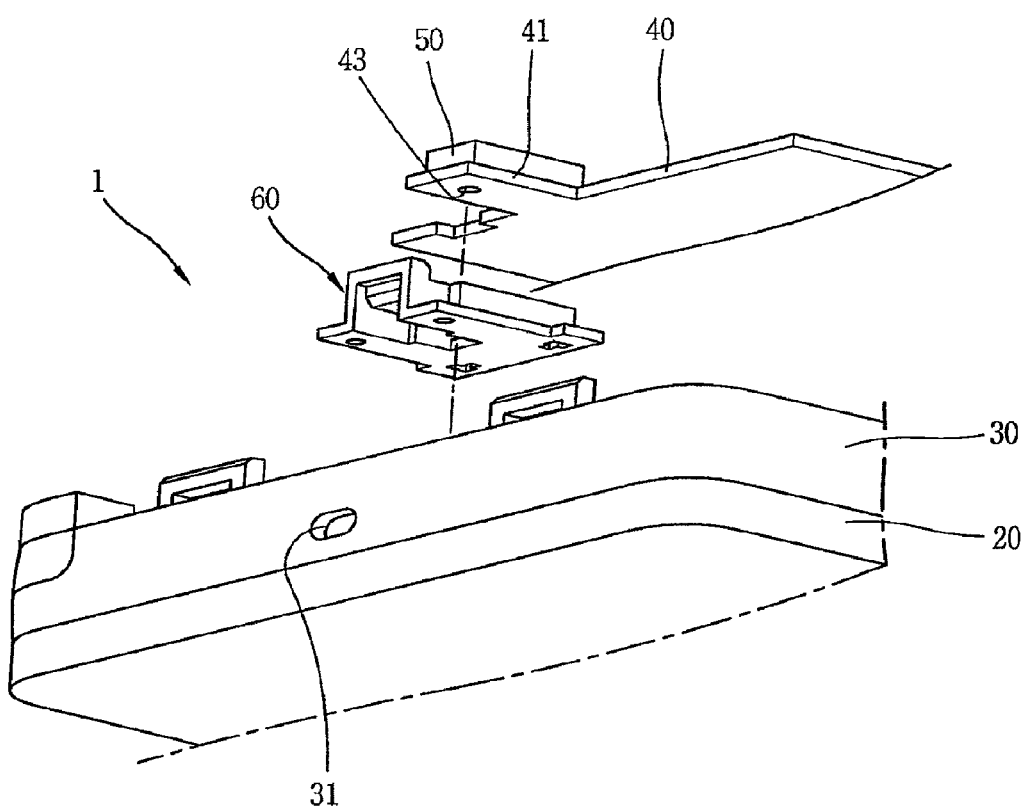
FIG. 4 is a rear exploded perspective view showing the microphone of the mobile terminal of FIG. 1.

As shown in FIGS. 3 and 4, the third case member 30 includes a horizontal support plate 32 that supports a circuitry supporting substrate or circuit board 40 with components 42 mounted thereon. The microphone 50 mounted on the circuit board 40 is also supported.

The microphone hole 31 is configured in the first direction substantially perpendicular to the side of the mobile terminal 1 (See FIG. 3), and the microphone 50 includes a sound receiving portion 51 (See FIG. 7) that receives sound and is disposed in a second direction different from the first direction. For example, the second direction may be substantially perpendicular to the first direction. Here, the first and second directions indicate that the microphone hole 31 and the microphone 50 are disposed to be at cross-angles with each other, and this configuration can be applied for any case where the first and second directions are not the same.

Preferably, but not required, the microphone 50 can be disposed on the same surface of the circuit board 40 on which the components 42 are disposed, thereby preventing an increase in the thickness of the mobile terminal that may result from mounting the microphone 50. The microphone 50 is mounted on a microphone mounting part 41 formed at a portion protruded from a lower end of the circuit board 40, and the sound receiving portion 51 is disposed to contact or face the circuit board 40. A through hole 43 allowing a voice to pass through the sound receiving portion 51 is oriented in the second direction.

A sound guide unit 60 is disposed between the microphone hole 31 and the sound receiving portion 51 to concentratively guide a sound, such as a voice, which has come through the microphone hole 31 formed in the first direction, to the sound receiving portion 51 of the microphone 50 formed in the second direction without a loss of sound. The sound guide unit 60 may be made of flexible rubber or a plastic material having soft elasticity in order to facilitate assembling of the circuit board 40 with the microphone 50 mounted thereon in the terminal case, as well as detaching or re-mounting of the circuit board 40, and to prevent a leakage of sound.

With reference to FIG. 3, a holding line portion 38 is formed on the support plate 32 along edges of the sound guide unit 60 to allow the edges of the sound guide unit 60 to be mounted thereon. The holding line portion 38 serves to prevent the support plate 32 from deviating from a position where the support plate 32 is to be assembled in the process of assembling the sound guide unit 60 and also to prevent a leakage of a sound through a gap between the sound guide unit 60 and the support plate 32.

Figure 5:
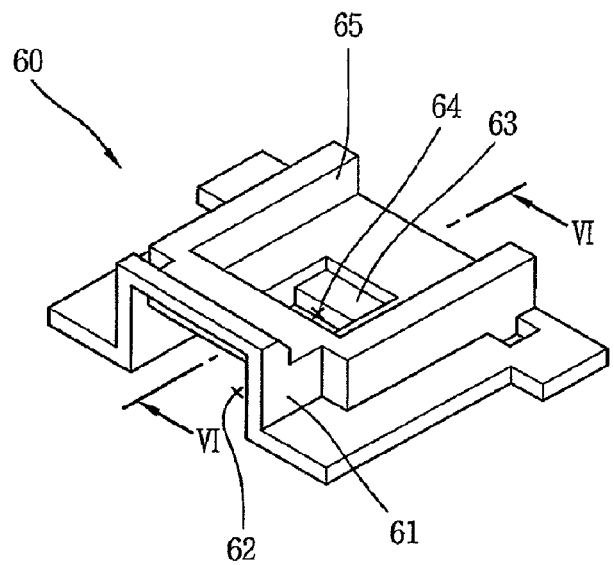
FIG. 5 is a perspective view showing a sound guide unit according to the exemplary embodiment of the present invention.
Figure 6:
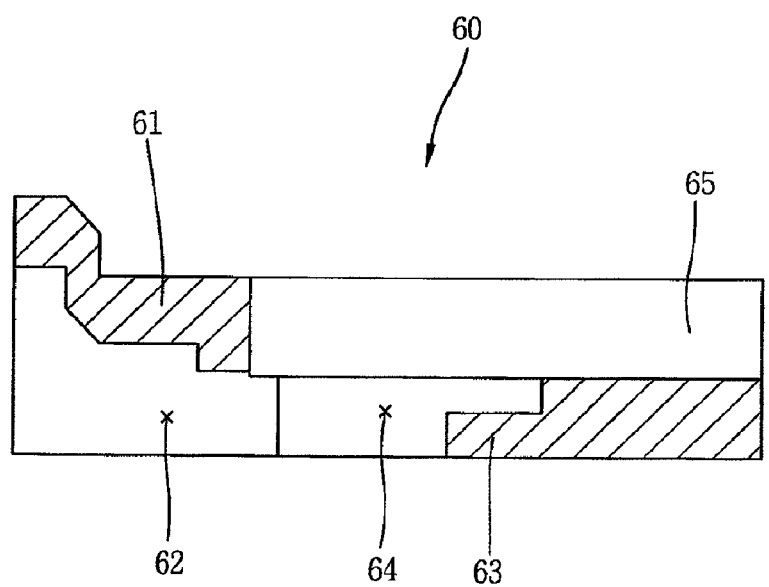
FIG. 6 is a sectional view taken along line VI-VI of the sound guide unit of FIG. 5.

As shown in FIGS. 5 and 6, the sound guide unit 60 includes a first wall body 61 that forms a first guide portion, which may take the form of a first guide channel 62, that receives sound, such as a voice, coming in the first direction through the microphone hole 31 formed at the third case member 30. The sound guide unit 60 includes a second wall body 63 that is formed to communicate with the first channel 62 and forms a second guide portion, which may take the form of a second guide channel 64, for guiding the sound toward the sound receiving portion 51 of the microphone 50. A lower surface of the first wall body 61 is attached to the support plate 32 and an upper surface of the second wall body 63 is attached to the circuit board 40. Preferably, the first wall body 61 and the second wall body 63 are integrally formed so that they can be easily molded and handled.

An edge holding portion 65 is formed on and projects from the front surface of the sound guide unit 60 and hermetically closes and covers the rear surface and edges of the microphone mounting part 41. When the sound guide unit 60 is mounted between the circuit board 40 and the third case member 30, the edge holding portion 65 serves to facilitate determining of an assembling position of the sound guide unit 60 and prevent a leakage of sound.

Figure 7:
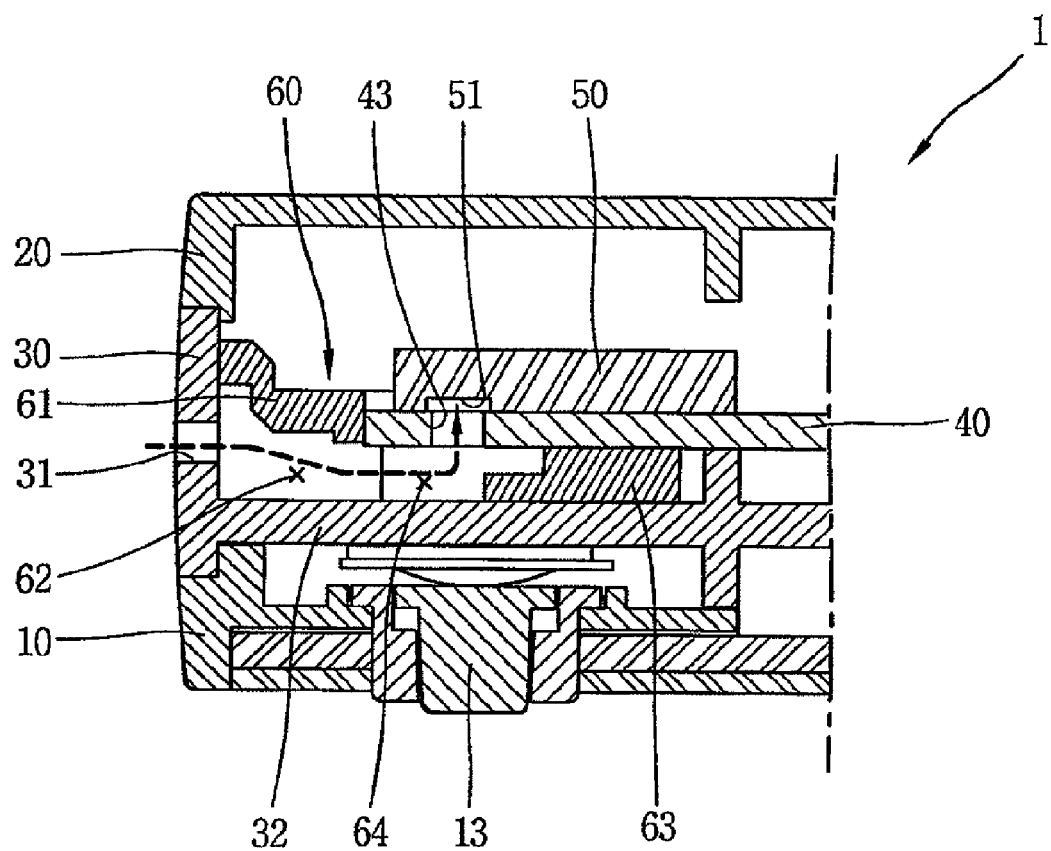
FIG. 7 is a sectional view of the mobile terminal of FIG. 2.

As shown in FIG. 7, although a sound, such as a voice of the user, comes in the first direction through the microphone hole 31, it propagates along the first channel 62 and the second channel 64 of the sound guide unit 60, without being leaked to a different space at the interior of the mobile terminal 1, and reaches the sound receiving portion 51 of the microphone 50 (see the dotted arrow). The cross-sectional area of the first channel 62 decreases as the first channel 64 extends along the first direction. As a result, the sound is concentrated as it moves through the first channel 64 along the first direction.

The sound guide unit 60 can be adapted to other design modification in which the mounting positions and directions of the microphone 50 and the microphone hole 31 are different. In addition, the sound guide unit 60 can be easily configured to have a simple structure, so it is easily manufactured.

Figure 8:
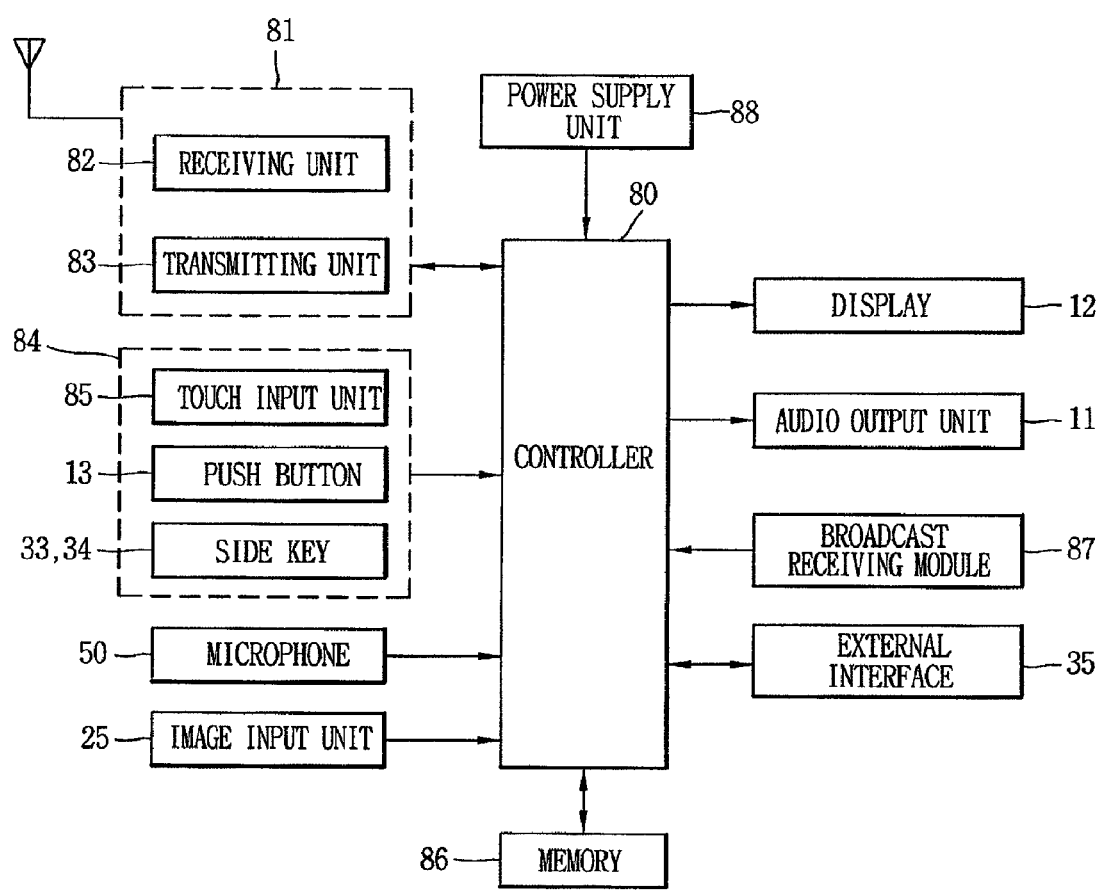
FIG. 8 is a schematic block diagram of the mobile terminal according to the exemplary embodiment of the present invention.

FIG. 8 is a schematic block diagram of the mobile terminal according to an exemplary embodiment of the present invention. With reference to FIG. 8, the mobile terminal according to the exemplary embodiment includes a wireless communication module 81, a manipulation unit 84, the image input unit 25, the microphone 50, the display 12, the audio output unit 11, the external interface 35, a broadcast receiving module 87, a memory 86, a power supply unit 88, and a controller 80.

The controller 80 typically controls the general operations of the mobile terminal. For example, the controller 80 performs controlling and processing associated with voice calls, data communications, video calls, and the like.

The wireless communication module 81 transmits/receives radio signals to/from a mobile communication base station via an antenna. For example, the wireless communication module 81 includes a transmitting unit 83 that handles transmission/reception of voice data, character data, image data and control data under the control of the controller 80 and a receiving unit 82 that demodulates a received signal under the control of the controller 80.

The manipulation unit 84 may include a touch input unit 85, the push button 13, and side keys 33 and 34 disposed within the display 12, and provide input data inputted to control the operations of the terminal to the controller 80.

The image input unit 25 processes image data of still pictures or videos obtained by an image capture device in a video capturing mode or an image capturing mode. The processed image frames may be converted into image data that can be displayed on the display 12 and outputted to the display 12. The image frames processed by the image input unit 25 may be stored in the memory 86 or transmitted to outside via the wireless communication module 81 under the control of the controller 80.

The microphone 50 may receive sounds (audible data) in a phone call mode, a recording mode, a voice recognition mode, and the like, and process it into audio data. The processed audio (voice) data may be converted for output into a format transmittable to the mobile communication base station via the wireless communication module 51 in case of the phone call mode. In the recording mode, the processed audio data is stored in the memory 57. The microphone 50 may implement various types of noise canceling (or suppression) algorithms to cancel (or suppress) noise generated in the course of receiving or transmitting audio signals.

The display 12 may display and output information processed in the mobile terminal 1. For example, when the mobile terminal 1 is in the phone call mode, the display 12 may display a User Interface (UI) or a Graphic User Interface (GUI) associated with a call or other communication under the control of the controller 80. When the mobile terminal 1 is in the video call mode or the image capturing mode, the display 12 may display and output a captured image or a UI, a GUI, and the like. When the display 12 includes a touch screen, the display 12 may function as both an input device and an output device.

The audio output unit 11 may convert audio data received from the wireless communication module 81 or stored in the memory 86 under the control of the controller 80 and output the converted audio data to the exterior. For example, the audio data may be from a call signal reception mode, phone call mode, recording mode, voice recognition mode, a broadcast reception mode, and the like. Also, the audio output unit 11 may provide audible outputs related to a particular function (e.g., a call signal reception sound, a message reception sound, etc.) performed by the mobile terminal. The audio output unit 11 may include a speaker, a receiver, a buzzer, a sound generating device, or the like.

The external interface 35 serves as an interface with at least one external device connected with the mobile terminal. For example, the external devices may include wired/wireless headsets, external power chargers, wired/wireless data ports, card sockets (e.g., for receiving a memory card, a Subscriber Identity Module/User Identity Module (SIM/UIM) card, etc.), and the like. The external interface 35 may be used to receive inputs (e.g., data, information, power, etc.) from an external device and transfer the received inputs to one or more elements within the mobile terminal 1, or may be used to transfer data from the mobile terminal 1 to an external device.

The memory 86 may store software programs or the like used for the processing and controlling performed by the controller 80, or may temporarily store inputted/outputted data (e.g., a phonebook, messages, still images, video, etc.). A program for controlling the operations of the mobile terminal related to the present invention is stored in the memory 86. The memory 86 may include a generally known hard disk type, a card type, a card-type memory (e.g., SD or DX memory, etc), a flash memory, a Random Access Memory (RAM), a Read-Only Memory (ROM), and the like.

The broadcast receiving module 87 may receive a broadcast signal transmitted through a satellite or a ground wave, convert the received broadcast signal into a data format that can be outputted to the audio output unit 11 and the display 12, and outputs the converted data to the controller 80. In addition, the broadcast receiving module 87 receives supplementary data (e.g., an Electric Program Guide (EPG), a channel list, etc.) associated with a broadcast. The broadcast data and supplementary data converted in the broadcast receiving module 87 may be stored in the memory 86. The power supply unit 88 receives external or internal power and supplies power required for the operations of the respective elements under the control of the controller 80.

As the exemplary embodiments of the mobile terminal may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed:

1. A mobile communication terminal comprising:
   a terminal housing including a microphone hole formed on an outer surface of the housing, the microphone hole extending through the housing in a first direction;
   a microphone installed within the terminal housing and having a sound receiving part configured to receive sound from a second direction different from the first direction; and
   a sound collecting part disposed between the microphone hole and the sound receiving part having a channel with a first opening facing the first direction and a second opening facing the second direction.

2. The mobile communication terminal of claim 1, wherein the second direction is perpendicular to the first direction.

3. The mobile communication terminal of claim 1, wherein a cross sectional area of the sound collecting part is reduced to allow sound coming along the first direction to concentrate sound as it goes in the first direction.

4. The mobile communication terminal of claim 1, wherein the sound collecting part is formed to concentrate sound as sound goes in the first direction.

5. The mobile communication terminal of claim 1, wherein a receiver unit is located at the opposite side of the microphone hole.

6. The mobile communication terminal of claim 1, wherein a display and a receiver are disposed on a front surface of the housing.

7. The mobile communication terminal of claim 6, wherein a sensor unit configured to sense a touch is disposed between the display and the housing.

8. The mobile communication terminal of claim 1, wherein at least one input unit is provided on one surface of the housing.

9. The mobile communication terminal of claim 6, wherein at least one input unit is further provided on a lower end of the display.

10. The mobile communication terminal of claim 1, wherein a circuit board is provided within the terminal housing, and a microphone is disposed on the circuit board.

11. The mobile communication terminal of claim 10, wherein the sound receiving part is disposed to be in contact with the circuit board.

12. The mobile communication terminal of claim 10, wherein the circuit board includes a through hole, and the through hole includes a microphone mounting portion formed in the second direction to allow sound to go in the second direction so as to be directed to the sound receiving part of the microphone.

13. The mobile communication terminal of claim 12, wherein the microphone mounting portion is formed to be protruded from the circuit board, and the sound collecting part includes edge portions to surround the microphone mounting portion.

14. The mobile communication terminal of claim 13, wherein the channel includes a first channel to guide sound in the first direction and a second channel to guide sound in the second direction.

15. The mobile communication terminal of claim 14, further comprising:
   a support face formed to be parallel to the circuit board, and the sound collecting part comprises:
   a first wall portion configured to form the first channel and having a lower surface attached to the support face; and
   a second wall portion configured to form the second channel and having an upper surface attached to the circuit board.

16. The mobile communication terminal of claim 1, wherein the sound collecting part is made of a soft rubber or a plastic material.

17. The mobile communication terminal of claim 1, wherein the frame member comprises a support face formed to be horizontal at a lower portion of the microphone hole, and the sound collecting part is supported by the support face.

18. The mobile communication terminal of claim 17, wherein the support face comprises a holding line portion, and the sound collecting part is attached to the holding line portion.

19. A mobile communication terminal comprising:
   a terminal housing;
   a microphone hole formed on an outer surface of a frame member to guide sound in a first direction;
   a microphone installed within the terminal housing and having a sound receiving part configured to receive sound from a second direction different from the first direction; and
   a sound collecting part disposed between the microphone hole and the sound receiving part and guiding a sound which has passed through the microphone hole to the sound receiving part by causing the sound to change direction.

20. The mobile communication terminal of claim 19, wherein the second direction is perpendicular to the first direction.

21. The mobile communication terminal of claim 19, wherein a cross sectional area of the sound collecting part is reduced along the first direction.

22. The mobile communication terminal of claim 19, wherein the sound collecting part is formed to concentrate sound as sound goes in the first direction.

23. The mobile communication terminal of claim 19, wherein a receiver unit is located at the opposite side of the microphone hole.

24. The mobile communication terminal of claim 19, further comprising:
   a circuit board formed within the terminal housing, and the microphone is disposed on the circuit board.

25. The mobile communication terminal of claim 24, wherein the sound receiving part is disposed to be in contact with the circuit board.

26. The mobile communication terminal of claim 24, wherein the circuit board includes a through hole, and the through hole includes a microphone mounting portion formed in the second direction to allow sound to go in the second direction so as to be directed to the sound receiving part of the microphone.

27. The mobile communication terminal of claim 23, wherein the sound collecting part includes a first channel to guide sound in the first direction and a second channel to guide a-sound in the second direction.

28. The mobile communication terminal of claim 27, further comprising:
   a support face formed to be parallel to the circuit board, and the sound collecting part comprises:
   a first wall portion configured to form the first channel and having a lower surface attached to the support face; and
   a second wall portion configured to form the second channel and having an upper surface attached to the circuit board.

29. A sound guide of a mobile communication terminal having a microphone disposed on an internal circuit board, the sound guide comprising:
- a sound collecting part disposed on one surface of the circuit board,
- wherein the sound collecting part comprises:
  - a first wall portion to guide sound in a first direction; and
  - a second wall portion to guide sound to a sound receiving part of the microphone in a second direction different from the first direction.

30. The sound guide of claim 29, wherein the second direction is perpendicular to the first direction.

31. The sound guide of claim 29, wherein a cross sectional area of the sound collecting part is reduced to allow sound coming along the first direction to be concentrated as it goes in the first direction.

32. The sound guide of claim 29, wherein the sound collecting part is formed to be concentrated as sound goes in the first direction.

33. The sound guide of claim 29, wherein the sound collecting part is made of a soft rubber or a plastic material.

34. The sound guide of claim 29, wherein the sound collecting part comprises:
- a first wall portion forming the first wall portion; and
- a second wall portion forming the second wall portion.

35. The sound guide of claim 34, wherein the sound collecting part comprises an edge portion extending from the second wall portion, and the extending edge portion is formed such that it tightly attaches the second wall portion to the circuit board.

36. A sound guide of a mobile communication terminal including a terminal housing having a microphone hole formed on its outer surface to internally guide sound in a first direction and a microphone disposed on a circuit board provided within the terminal housing, wherein a sound receiving part of the microphone is formed to receive sound in a second direction different from the first direction, the sound guide comprising:
- a sound collecting part disposed on one surface of the circuit board,
- wherein the sound collecting part comprises:
  - a first wall portion to guide sound which has passed through the microphone hole in the first direction; and
  - a second wall portion to guide sound to the sound receiving portion in the second direction different from the first direction.

37. The sound guide of claim 36, wherein the second direction is perpendicular to the first direction.

38. The sound guide of claim 36, wherein a cross sectional area of the sound collecting part is reduced along the first direction.

39. The sound guide of claim 36, wherein the sound collecting part is formed to concentrate sound as sound goes in the first direction.

* * * * *